US009406947B2

(12) United States Patent
Vincent et al.

(10) Patent No.: US 9,406,947 B2
(45) Date of Patent: Aug. 2, 2016

(54) METALLIC BIPOLAR PLATE FOR A PROTON-EXCHANGE MEMBRANE FUEL CELL

(71) Applicant: Commissariat A L'Energie Atomique Et Aux Energies Alternatives, Paris (FR)

(72) Inventors: Rémi Vincent, Grenoble (FR); Julien Tard, Saint Quentin Fallavier (FR)

(73) Assignee: Commissariat A L'Energie Atomique Et Aux Energies Alternatives, Paris (FR)

( * ) Notice: Subject to any disclaimer, the term of this patent is extended or adjusted under 35 U.S.C. 154(b) by 322 days.

(21) Appl. No.: 14/174,153

(22) Filed: Feb. 6, 2014

(65) Prior Publication Data
US 2014/0234748 A1    Aug. 21, 2014

(30) Foreign Application Priority Data
Feb. 15, 2013    (FR) ...................................... 13 51331

(51) Int. Cl.
*H01M 8/02* (2016.01)
*H01M 8/10* (2016.01)

(52) U.S. Cl.
CPC .......... *H01M 8/0245* (2013.01); *H01M 8/0206* (2013.01); *H01M 8/0213* (2013.01); *H01M 8/0221* (2013.01); *H01M 8/0226* (2013.01); *H01M 8/0228* (2013.01); *H01M 8/0267* (2013.01); *H01M 8/1039* (2013.01); *H01M 2008/1095* (2013.01); *Y02E 60/50* (2013.01)

(58) Field of Classification Search
None
See application file for complete search history.

(56) References Cited

U.S. PATENT DOCUMENTS

| 7,699,916 | B1 | 4/2010 | Carter et al. |
| 2004/0091768 | A1 | 5/2004 | Abd Elhamid et al. |
| 2011/0223522 | A1 | 9/2011 | Kim et al. |
| 2014/0011115 | A1 | 1/2014 | Vincent et al. |

FOREIGN PATENT DOCUMENTS

| EP | 2 112 250 A1 | 10/2009 |
| EP | 2 234 192 A2 | 9/2010 |
| EP | 2 469 634 A2 | 6/2012 |
| FR | 2 971 628 A1 | 8/2012 |

OTHER PUBLICATIONS

Heli Wang et al, "*The Influence of Metal Ions on the Conductivity of Nafion 112 in Polymer Electrolyte Membrane Fuel Cell*," Journal of Power Sources, vol. 183, Issue 2, Sep. 1, 2008, pp. 576-580.
Michael J. Kelly et al., "*Contaminant Absorption and Conductivity in Polymer Electrolyte Membranes*," Journal of Power Sources, vol. 145, Issue 2, Aug. 18, 2005, pp. 249-252.
Allen Hermann, et al., "*Bipolar Plates for PEM Fuel Cells: A Review*," International Journal of Hydrogen Energy, vol. 30, Issue 12, Sep. 2005, pp. 1297-1302.
French Search Report dated Oct. 16, 2013.

*Primary Examiner* — Tracy Dove
(74) *Attorney, Agent, or Firm* — Burr & Brown, PLLC

(57) ABSTRACT

A metallic plate for a proton-exchange membrane fuel cell (PEMFC) having, on at least one of its surfaces, a coating including: conductive material fillers; a polymer used as a binder; and a metal cation absorbing compound.

13 Claims, 1 Drawing Sheet

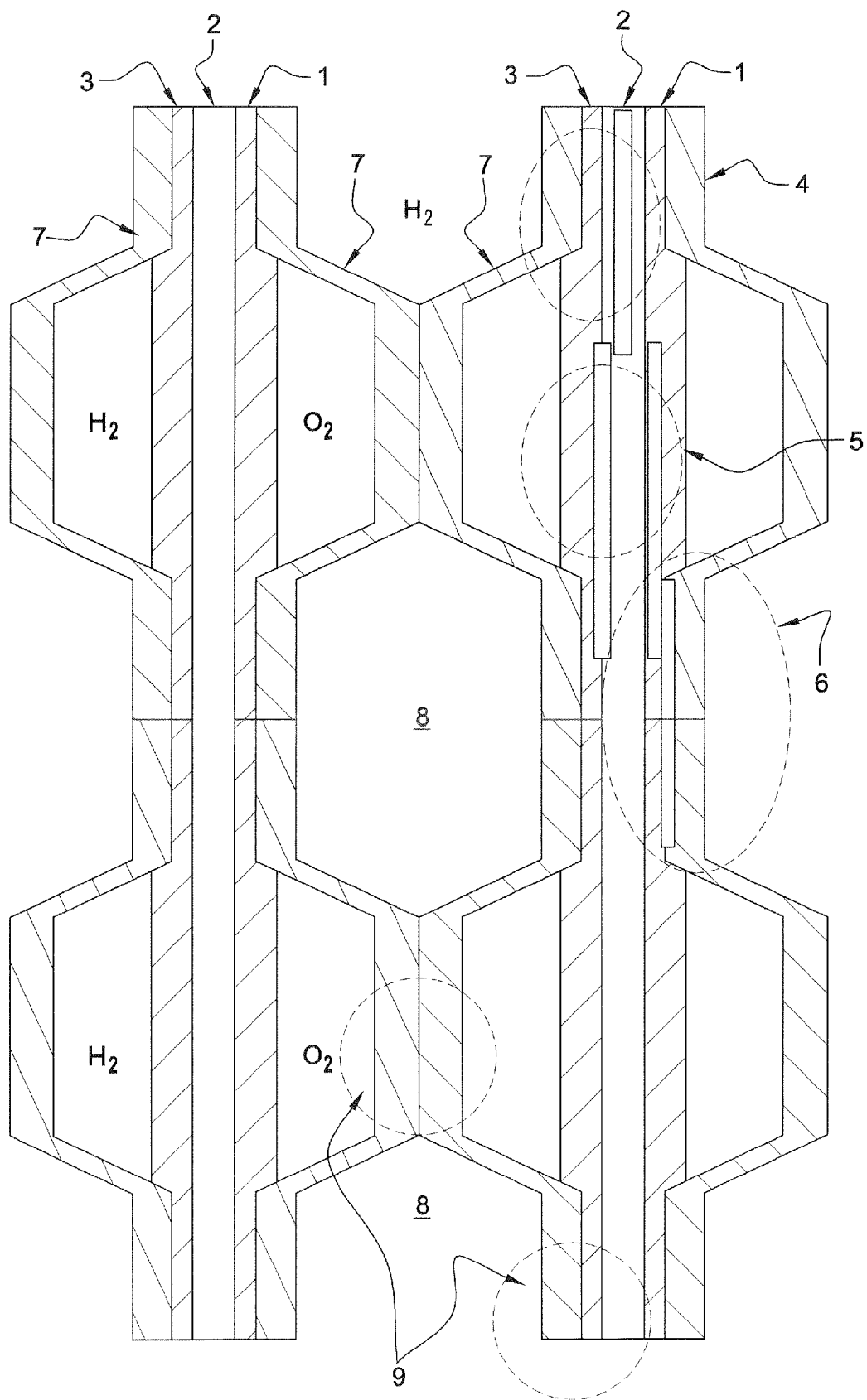

METALLIC BIPOLAR PLATE FOR A PROTON-EXCHANGE MEMBRANE FUEL CELL

BACKGROUND OF THE INVENTION

1. Field of the Invention

The present invention relates to a metallic bipolar plate for a fuel cell, and more specifically for a proton-exchange membrane fuel cell (PEMFC). According to the invention, this plate has a coating comprising a compound capable of absorbing metal cations, advantageously in the form of an ionomer, for example, of perfluorosulphonic acid (PFSA) polymer type.

A cell provided with such a plate, especially usable to generate electric power, has a better corrosion resistance and an improved performance, as well as an increased lifetime. This type of cells may especially be envisaged as a power source for motor vehicles produced at a large scale in the future.

2. Description of Related Art

A fuel cell is an electrochemical device which converts chemical energy directly into electrical energy. A fuel cell comprises a stack of several series-connected cells. Each cell generates a voltage in the order of 0.7 volt and their stacking enables to generate a power supply voltage of higher level, for example, in the order of some hundred volts.

More specifically, a proton exchange membrane fuel cell or PEMFC comprises at least one unit cell containing a membrane-electrode assembly or MEA, formed of an electrolytic membrane selectively letting through protons and, on either side of this membrane, the anode and the cathode.

The membrane is generally made of a perfluorosulphonic ionomer (PFSA), such as Nafion®. The electrodes, also called catalytic or active layers, contain a catalyst, advantageously platinum (Pt), supported by carbon, and possibly an ionomer, generally the same as that forming the membrane.

At the anode level, dihydrogen ($H_2$), used as fuel, is ionized to produce protons crossing the membrane. The electrons produced by this reaction migrate towards a flow plate and then cross an electric circuit external to the cell to form an electric current. At the cathode level, oxygen ($O_2$) is reduced and reacts with the protons having crossed the membrane to form water.

Gas diffusion layers or GDL, conventionally made of graphite fibers, are interposed between the electrodes and the flow plates.

As already mentioned, a PEMFC may comprise a stack of unit cells, and thus a plurality of MEAs arranged between two flow plates. In this configuration, two adjacent unit cells are generally separated by a same plate, having one of its surfaces in contact with the cathode compartment of a first MEA and its other surface in contact with the anode compartment of a second MEA (FIG. 1). For this reason, the flow plates of PEMFCs are generally called "bipolar plates".

Thus, a bipolar plate performs several functions, including, in particular:
- the distribution of gases ($H_2$, $O_2$, or air) and the discharge of the water formed, possibly via channels and/or ports formed therein;
- the collection of the electrons generated at the anodes of the different unit cells, which implies for the plate to be electrically conductive;
- the cooling of the unit cells, possibly via the flowing of a cooling liquid therethrough;
- a mechanical support for the MEA.

For cost, bulk, and performance reasons, a bipolar plate for PEMFC is generally made of metal.

The bipolar plate is however placed in a corrosive environment, which may cause its degradation along time with, as a consequence, the salting out of metal ions in the case of a metallic plate.

Such a corrosion may have several consequences:

In extreme cases, corrosion phenomena may result in a perforation of the plate, causing a loss of tightness between the anode and cathode compartments.

The plate corrosion may cause the forming of an insulating oxide layer on the metal, which increases its resistance of contact with the gas diffusion layer, whereby the electric resistance between the plate and the GDL is increased, and the fuel cell performance is decreased.

Further, the salted-out metal ions may alter the operation of the electrolytic membrane. Thus, WANG et al. (Journal of Power Sources 183, 2008, 576-580) and KELLY et al. (Journal of Power Sources 145, 2005, 249-252) have highlighted the adverse influence of metal ions ($Fe^{3+}$ and $Cr^{3+}$; $Fe^{3+}$, $Cu^{2+}$ and $Ni^{2+}$, respectively) on the conductivity of a Nafion®-type proton exchange membrane. The metal ions may also "contaminate" the catalyst present at the electrodes, by occupying the active sites, and thus decrease the catalytic activity. Accordingly, the cell performance and durability may be very negatively affected by the degradation of the bipolar plate.

To decrease the corrosion of metallic plates, solutions implemented in prior art have especially comprised protecting said plates by means of a coating also having electric conduction properties.

It may in particular be a coating containing noble metals, or carbon in a polymer matrix.

On this regard, document EP 2469634 describes a metallic bipolar plate having a discontinuous film containing a noble metal (Au, Pt, Ir, Ru) and an oxide film formed on the plate portion which does not comprise the discontinuous film.

Document EP 2112250 describes a metallic bipolar plate having, at its surface, a passive layer containing chromium, and then a film made of nitride metal ($MN_x$), metal/nitride metal ($M/MN_x$), carbide metal ($MC_y$), or boride metal ($MB_z$).

Further, document U.S. Pat. No. 7,699,916 describes a bipolar plate having a polymer film coating containing conductive particles smaller than 10 micrometers.

Document FR 2971628 describes the insertion of layers made of a polyurethane matrix having conductive material fillers included therein, between the metallic bipolar plate and the gas diffusion layer.

In practice, coatings developed in prior art enable to physically protect the metallic bipolar plate from the corrosive environment of the fuel cell.

There however is a permanent need to develop new technical solutions enabling to limit the degradation of metallic plates for PEMFCs and above all to improve the durability of the performance of such cells.

SUMMARY OF THE INVENTION

The present invention falls within this context. In an original way, the Applicant has developed a coating for a PEMFC metallic plate, forming both a physical and a chemical barrier. Thus, the plate is protected from the corrosive environment, which avoids for it to be degraded. Further, the cell core, that is, the membrane as well as the electrodes, is protected from the possible release of metal ions, which enables to maintain the cell performance and durability.

Thus, and according to a first aspect, the invention relates to a metallic plate having, on at least one of its surfaces, a coating comprising:
  conductive material fillers;
  a polymer used as a binder;
  a compound absorbing metal cations.

In the framework of the invention, "metallic plate" designates a plate containing metal, or even made of metal, advantageously stainless steel. The materials used to form bipolar plates containing metal are disclosed in document Hermann et al. (*International Journal of Hydrogen Energy* 30 (2005) 1297-1302).

The metallic plate is thus made of an electrically-conductive material particularly enabling to collect the electrons generated at the cell anode. Thus, in the framework of the invention, it may be called "flow plate" as well as "current collection plate" or "bipolar plate".

In the context of its use in a fuel cell, such a plate advantageously has a rectangular or even square shape, with a surface area in the range from 100 to 1,000 cm$^2$, for example, 220 cm$^2$. Its thickness may vary between 50 and 500 µm, and may for example be 200 µm. It should be noted that a plate may actually be formed of two or a plurality of stacked plates, advantageously soldered together, which enables to form cooling channels between plates.

Again in relation with its use in a cell, such a plate is advantageously provided with teeth and/or with channels. Preferably, the teeth are located on the front surface of the plate in contact with the electrode to collect the current produced, while the channels enable the inlet of gases and the discharged of the produced water.

Typically, according to the invention, such a plate is provided with a coating on at least one of its surfaces, advantageously that intended to be in contact with the gas diffusion layer. In practice and in the case of the stacking of a MEA and of a bipolar plate, the metallic plate is coated on both its surfaces. According to a specific embodiment, the coating forms a continuous layer over the entire surface of the plate.

Advantageously, the coating appears in the form of a continuous layer having a preferably uniform thickness. More advantageously still, the coating thickness is in the range from 1 to 50 micrometers, or even from 10 to 20 micrometers.

Such a coating comprises at least one polymer forming a polymer matrix and/or behaving as a binder, capable of providing an acceptable mechanical resistance to the coating. Further, such a polymer should resist the operating conditions of a cell. A polymer mixture may also be envisaged.

According to a specific embodiment, such a polymer is of polyurethane type, that is, a urethane polymer. In practice, polyurethane may be obtained by condensation between a polyol (for example, Bayer's Bayhydrol®) and a polyisocyanate, advantageously a diisocyanate (for example, Bayer's Bayhydur®).

To provide the electrically-conductive character desired for such a coating, said coating also comprises conductive material fillers, advantageously included in the polymer matrix. Such fillers may be made of carbon black, graphite, carbon fibers, or a mixture thereof.

Advantageously, the fillers appear in the form of particles having a size smaller than one micrometer. As an example, carbon black having a nanometric grain size, advantageously smaller than 100 nanometers, may be used. The fillers may particularly appear in the form of clusters of carbon black nanoparticles.

The filler mass proportion in the coating is advantageously in the range from 35 to 55% (dry weight of the fillers relative to the dry weight of the total coating), or even from 40 to 50%.

Typically, according to the invention, the coating also has the property of absorbing metal ions, in particular metal cations capable of being salted out by the metallic plate.

In the case of a steel plate, these are, particularly, iron ions ($Fe^{3+}$), chromium ions ($Cr^{3+}$), and possibly nickel ($Ni^{2+}$) ou molybdenum ($Mo^{2+}$) ions.

According to a first embodiment, said compound may be activated carbon supposed to absorb metal ions due to its high porosity.

Preferably, the metal cation absorbing compound has ionic and/or ionizable functions or groups. In the specific case where the compound is a polymer, it may comprise ionic or ionizable units, thus forming an ionomer.

Given the cationic nature of the metal ions in presence, the metal ion absorbing compound advantageously supports anionic functions, and more advantageously sulphonic functions ($SO_3H/SO_3^-$).

In practice, an acid-base reaction takes place between cation $M^+$ and function $SO3^-$ of the compound, with an equilibrium strongly shifted towards the forming of an intimate ion pair. The metal cations have a very low mobility since these ions have a strong affinity for the base due to the fact that they form a "soft" acid, unlike protons which are "hard" (whereby a low affinity and a greater mobility).

According to a specific embodiment, the metal cation absorption function may be directly ensured by the polymer behaving as a binder, which advantageously amounts to from 45 to 65% by weight of the final coating (dry weight of the polymer relative to the dry weight of the total coating), more advantageously still from 50 to 60%. In this specific case, the coating comprises, or is even made of, an ionomer capable of absorbing metal cations and of behaving as a binder, as well as conductive material fillers.

According to another embodiment, the polymer behaving as a binder and the metal cation absorbing compound are two different molecules. Generally, the metal cation absorbing compound advantageously amounts to from 1 to 10% by weight of the coating (dry weight of the metal cation absorbing compound relative to the dry weight of the total coating), or even from 5 to 10%.

According to a preferred embodiment, the metal cation absorbing compound is also polymeric, thus forming an ionomer, advantageously a cation-absorbing ionomer. In the framework of the invention, "cation-absorbing ionomer" designates an ionomer having its ionized and/or ionizable groups particularly enabling to absorb positively charged metal ions.

In this case, the polymer used as a binder and the metal cation absorbing polymer advantageously amount to from 45 to 65% by weight of the final coating (dry weight of the polymers relative to the dry weight of the total coating), more advantageously still from 50 to 60%. Inside of the polymer component of the coating, the metal cation absorbing ionomer advantageously amounts to from 1 to 10% by weight of the final coating (dry weight of the metal cation absorbing ionomer relative to dry weight of the total coating), more advantageously still from 5 to 10%.

Such an ionomer may particularly be a polymer having its main chain comprising $CF_n$ groups (n=1, 2), further supporting sulphonic acid groups, in the form of acid or of a formed salt. It may particularly be a perfluorosulphonic polymer or perfluorosulphonic acid (PFSA). PFSAs are ionomers derived from perfluorosulphonic acid, that is, comprising sulphonate groups $SO_3^-$. They also are fluorinated polymers.

Thus, unexpectedly, the Applicant has shown that ionomers currently used in the context of PEMFCs, contained in membrane to ensure the transport of protons and possibly present in catalytic layers, could be integrated in coatings according to the invention. Such ionomers used for their ability to absorb protons (H⁺) are thus used in the plate to absorb metal cations.

Generally, PFSA polymers have a formula —[CF$_2$—CF$_2$]$_x$—[CF(O—R$^f$—SO$_3$H)—CF$_2$]$_y$, where R$^f$ is a fluorinated carbon group, x and y being positive integers.

Such ionomers are commercially available, for example, under trade name Nafion® (Dupont), Aquivion® (Solvay), Flemion® (Asahi Glass), Fumion® (Fumatech), or Aciplex® (Asahi Chemical Company).

A particularly adapted ionomer is a sulfonated tetrafluoroethylene derivative, for example sold under trade name Nafion® (Dupont). As an example, product Nafion® D2020 number CAS 31175-20-9 may be used in the context of the present invention.

Such an ionomer advantageously has the following dangling chain structure:

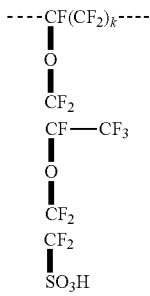

k being a positive integer.

Another adapted ionomer is a tetrafluoroethylene and Sulfonyl Fluoride Vinyl copolymer, for example, sold under trade name Aquivion® (Solvay), advantageously under number CAS 111173-25-2.

Such an ionomer advantageously has the following dangling chain structure:

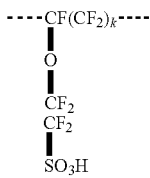

k being a positive integer.

According to a specific embodiment, the ionomer present in the coating according to the invention is the same as that forming the cell membrane, and possibly as that present in the catalytic layers of said cell.

As already mentioned, the metal ion absorbing compound, advantageously an ionomer, more advantageously still a PFSA such as Nafion®, may amount to from 1 to 10% by weight of the coating (dry weight of the compound relative to the dry weight of the total coating), or even from 5 to 10%.

In the case where it is the same ionomer as that forming the cell membrane, the quantity of ionomer present in the coating may be expressed in % by weight of the membrane weight. Advantageously, the mass proportion of the ionomer in the coating amounts to from 0.5 to 5% of the cell membrane weight.

Thus, advantageously, the coating of the metallic plate according to the invention comprises, in dry weight relative to the dry weight of the coating:

from 35 to 55% of conductive material fillers;
from 45 to 65% of polymers, including from 1 to 10% of the metal cations absorbing compound, advantageously when said compound is an ionomer.

According to a preferred embodiment of the invention, the coating comprises or is made of:

from 40 to 50% of conductive material fillers, advantageously carbon black;
from 50 to 60% of polymers, including from 5 to 10% of the metal cation absorbing compound, advantageously polyurethane and a PFSA such as Nafion®.

The coating may also comprise at least one additive, which may be selected from the group comprising:

a surface-active agent such as SDS (Sodium Dodecyl Sulfate) or Triton X100, intended to promote the filler dispersion in the solution providing the coating; and/or
a surface agent, such as Byk33, intended to level the surface of the coating, thus providing a better electric contact.

Such additives may however have the disadvantage of contaminating the membrane. Remarkably, it has been observed in the context of the invention that the presence of the metal cation absorbing compound could enable to do without a surface-active agent and thus avoid a possible contamination of the membrane. This is particularly true when the metal cation absorbing compound is an ionomer having a hydrophobic chain and a hydrophilic group, particularly a PFSA such as Nafion®. Thus, and according to a specific embodiment, the coating according to the invention contains no additional surface-active agent.

In adapted fashion, such a plate is intended for fuel cells, advantageously proton-exchange membrane fuel cells (PEMFC).

Thus, an according to another aspect, the present invention aims at a proton-exchange membrane fuel cell (PEMFC) comprising at least one metallic plate such as defined hereabove.

Advantageously, in this context, the metallic plate has a coating at least on its surface in contact with the gas diffusion layer (GDL). In the case of a bipolar plate and of a cell stack, the plate comprises a coating such as defined hereabove on each of its surfaces.

As already mentioned, the metal cation absorbing compound is preferably the same ionomer as that forming the membrane and/or as that present in the catalytic layers, advantageously a PFSA such as Nafion®.

According to another aspect, the present invention relates to a composition and to a method providing a coated metallic plate, as defined hereabove.

Typically, such a composition comprises:
conductive material fillers;
a polymer intended to behave as a binder or precursors thereof;
a metal cation absorbing compound, advantageously an ionomer;
a solvent.

The carrier solvent should enable to solubilize the polymer behaving as a binder and/or of the ionomer, and may be water and/or an alcohol (ethanol, propanol, . . . ). It may of course be a mixture of solvents. In the composition according to the invention, the mass proportion of dry matter is typically in the range from 1 to 20%, particularly depending on the deposition method, the solvent then forming from 80 to 99% by mass of the composition.

The mass proportions, in the composition, of the conductive material fillers, of the binding polymer, and of the metal cation absorbing compound are such that, after evaporation of the carrier solvent, their mass proportions in the coating are as indicated hereabove.

It should be noted that the polymer behaving as a hinder may be obtained by polymerization directly in the composition or even in situ on the plate. In this case, adapted monomers or precursors may be used instead of the final polymer. In the case of polyurethane, for example, the composition may contain a polyol (such as Bayhydrol® commercialized by Bayer) and a polyisocyanate (such as Bayhydur® commercialized by Bayer). In practice, the polymerization occurs by thermal treatment, typically in the following conditions:

at a temperature in the range from 130° C. to 170° C., advantageously equal to 135° C.;
for a duration lasting from a few minutes to a few hours, advantageously from 30 to 60 min.

As already mentioned in relation with the coating, such a composition may also comprise additives.

It may particularly comprise a surface-active agent, such as SDS (Sodium Dodecyl Sulfate) or Triton X100. Indeed, it is known that a surface-active agent helps dispersing the carbon black and the binder in solvent phase. The mass proportion of the surface-active agent in the composition should however be as low as possible since, as already mentioned, it may contaminate the membrane by salting out. It is advantageously smaller than 1%, typically between 0.1 and 1%.

Similarly to the preparation of a composition intended for the manufacturing of a conventional coating, the composition is prepared as follows:

dissolution of the surface-active agent in the solvent, advantageously while stirring;
addition of the conductive material fillers, advantageously carbon black;
addition of the polymer binder;
addition of the metal cation absorbing compound, advantageously an ionomer, more advantageously still a PFSA such as Nafion®;
possible dispersion of the conductive material fillers, advantageously carbon back, for example, with a magnetic bar or ultrasounds.

Remarkably, the metal cation absorbing compound, advantageously an ionomer, more advantageously still a PFSA such as Nafion®, may itself help dispersing the conductive material fillers in the solvent system.

According to a specific embodiment, the composition according to the invention as well as the obtained coating thus contains no other surface-active agent.

In this case, the composition preparation protocol is simplified:

dissolving of the metal cation absorbing compound, advantageously an ionomer, more advantageously still a PFSA such as Nafion®, in the solvent, preferably while stirring;
addition of the conductive material fillers, advantageously carbon black;
addition of the polymer binder;
possible dispersion of the conductive material fillers, advantageously carbon back, for example, with a magnetic bar or ultrasounds.

As already mentioned, other additives may be present in such a composition, such as for example surface agents enabling to smooth the coating surface.

The present invention also aims at a method of preparing the metallic plate comprising a coating such as defined hereabove, comprising the steps of:

depositing the described composition on a metallic plate;
drying the metallic plate.

The drying is performed at a temperature allowing the evaporation of the solvent system present, for example, between 60 and 80° C. for a water/ethanol mixture.

In the case where the polymer behaving as a binder is not in its polymerized form, a thermal treatment may be carried out in the above-described conditions. Such a thermal treatment may be performed after the plate drying, or may replace the drying.

The deposition of the composition to form the coating may be performed by any conventional method known by those skilled in the art, particularly by spreading, by spraying, by roller application, or by silk-screening.

The invention and the resulting advantages will better appear from the following drawings and examples, provided as a non-limiting illustration of the invention.

BRIEF DESCRIPTION OF THE DRAWINGS

FIG. 1 illustrates the corrosion phenomenon within a proton-exchange membrane fuel cell.

DESCRIPTION OF THE INVENTION

1/Deterioration of a Fuel Cell

FIG. 1 illustrates a fuel cell comprising a stack of MEAs (membrane-electrodes assemblies) separated by a bipolar plate (7).

Each MEA is formed of:
an anode (3) where hydrogen is oxidized to provide two protons and two electrons: $H_2 \rightarrow 2H^+ + 2e^-$;
a proton-exchange membrane (2);
a cathode (1) where oxygen is reduced into water: $2H^+ + 2e^- + 1/2 O_2 \rightarrow H_2O$.

Each of the electrodes is supported by a current collector, in this case a bipolar plate (7). Such a bipolar plate (preferably two plates soldered together, to have cooling channels therebetween) (7) has a structure allow the passing of reactive gases ($H_2$ and $O_2$ or air), but also of a cooling liquid (8).

In this specific embodiment, the metallic bipolar plate is arranged so as to allow the cooling of a fuel cell comprising a stack of unit cells.

During the fuel cell operation, the metallic bipolar plates (7) may be degraded by corrosion phenomena, particularly caused by the presence of an oxidizer (oxygen) or of an acid medium (protons originating from the reaction at the anode).

As already indicated, the corrosion of the metallic bipolar plate (7) generates metal ions which may:

(5) poison the catalysts present at the electrodes (1, 3);
(4) decrease the proton conductivity of the membrane (2);
(6) cause the forming of a passive film on the bipolar plate (7).

The metallic bipolar plate forming the object of the invention enables to overcome these pitfalls, due to the nature of its coating, in particular the presence of a compound, advantageously an ionomer, capable of capturing metal ions.

In the absence of such a coating, the corrosion may cause the perforation (9) of the proton-exchange membrane (2) and even of the bipolar plate (7), as shown in FIG. 1.

The bipolar plate transports the electrons generated at the anode (3) towards the cathode (1). It also enables to tightly separate the anode from the cathode to avoid any contact between gases ($H_2$ and $O_2$ or air).

Further, the metallic bipolar plate provides the cell with a mechanical support. It may also enable the distribution of gases ($H_2$ and $O_2$ or air) at the electrodes.

The water formed at the cathode may also be carried out due to the structure of the metallic bipolar plate.

Finally, the thermal regulation of the cell may be provided by circulating a cooling liquid within the metallic bipolar plate (8).

2/Protection of the Metallic Plate by Means of a Coating 2-1 Composition Used for the Coating Deposition:

An ink capable of providing a coating according to the invention is prepared according to the following protocol:
- Weighting the PFSA-type (Nafion®) metal cation absorbing ionomer: 1.6 g, the dry extract amounting to 20% (i.e., 0.32 g);
- Weighting the solvent: water/ethanol mixture, by a 7:1 proportion: 400 g of water+60 g of ethanol;
- Mixing the ionomer in the solvent by means of a magnetic bar;
- Weighting the carbon black (Vulcan XC72 carbon=conductive material fillers): 4 g;
- Mixing by means of a metal bar;
- Weighting the binder in solvent phase: product A (polyurethane, Bayer Bayhydrol® U XP 2239, 10 g, with a 33% dry extract, that is, 3.3 g) and product B (isocyanate, Bayer Bayhydur® BL 5335, 6 g with a 33% dry extract, that is, 2 g); Ultrasonic bath dispersion to break carbon clusters and magnetic bar mixing.

The final ink comprises a 2% dry extract and the solvent has a water/alcohol ratio of 7.

The coating obtained by means of such a composition thus has the following mass composition:
- conductive particles: Vulcan XC72 carbon: 41.6%
- binder: Bayer Bayhydrol®+Bayhydur® polyurethane: 55%
- metal cation absorbing ionomer: Nafion®: 3.4%

2-2 Obtaining of the Coating:

The coating is deposited by spraying, by may also be spread, rolled on, or silk-screened.

The spraying nozzle sprays the entire bipolar plate, in successive lines. Repeating this cycle enables to deposit thin successive layers, having a thickness in the order of one µm. The deposition of some twenty layers provides the final deposit.

The coating deposition protocol is the following:
- Cleaning the bipolar plate, for example, with acetone and alcohol.
- Starting the process and placing the tray at 60° C.
- Filling the tank with ink.
- Multilayer deposition in successive cycles. The drying occurs along the ink deposition.
- Stopping the process and removing the coated plate.
- Thermal treatment at 35° C. to crosslink the polymer, for 60 minutes.

The invention claimed is:

1. A metallic plate for a proton-exchange membrane fuel cell (PEMFC) having, on at least one of its surfaces, a coating comprising:
   - conductive material fillers;
   - a binder made of a polymer; and
   - a metal cation absorbing compound.

2. The metallic plate of claim 1, wherein the metal cation absorbing compound is an ionomer.

3. The metallic plate of claim 1, wherein the conductive material fillers are made of carbon black, graphite, carbon fibers, or a mixture thereof.

4. The metallic plate of claim 1, wherein the polymer of the binder is polyurethane.

5. The metallic plate of claim 2, wherein the coating comprises, in dry weight relative to the dry weight of the coating:
   - from 35 to 55% of the conductive material fillers; and
   - from 45 to 65% of polymers, including the polymer of the binder and including from 1 to 10% of the metal cation absorbing compound.

6. The metallic plate of claim 1, wherein the coating comprises no surface-active agent.

7. A proton-exchange membrane fuel cell (PEMFC) comprising at least one metallic plate of claim 1.

8. The proton-exchange membrane fuel cell (PEMFC) of claim 7, wherein the metallic plate has the coating at least on its surface in contact with the gas diffusion layer (GDL).

9. The proton-exchange membrane fuel cell (PEMFC) of claim 7, wherein the metal cation absorbing compound is at least one of the same ionomer as that forming a membrane of the PEMFC or the same ionomer present in catalytic layers of the PEMFC.

10. A method of preparing the metallic plate of claim 1, comprising the steps of:
    - providing a metallic plate;
    - depositing a coating composition on the metallic plate, the coating composition comprising conductive material fillers, a binder comprising a polymer or precursors thereof, a metal cation absorbing compound and a solvent;
    - and
    - drying the metallic plate.

11. The method of preparing a metallic plate of claim 10, wherein after the drying step, the metallic plate is submitted to a thermal treatment to obtain the polymer from the precursors thereof.

12. The metallic plate of claim 2, wherein the metal cation absorbing compound is a perfluorosulphonic polymer (PFSA).

13. The method of claim 10, wherein the step of depositing the coating composition comprises spreading, spraying, roller applying, or silk-screening the coating composition on the metallic plate.

* * * * *